United States Patent [19]

Stux et al.

[11] Patent Number: 5,707,760
[45] Date of Patent: Jan. 13, 1998

[54] ADDITIVES FOR INHIBITING DECOMPOSITION OF LITHIUM SALTS AND ELECTROLYTES CONTAINING SAID ADDITIVES

[75] Inventors: Arnold M. Stux; Jeremy Barker, both of Henderson, Nev.

[73] Assignee: Valence Technology, Inc., Henderson, Nev.

[21] Appl. No.: 762,080

[22] Filed: Dec. 9, 1996

[51] Int. Cl.$^6$ .................................. H01M 6/14
[52] U.S. Cl. ............................. 429/188; 429/192
[58] Field of Search ........................ 429/191, 192, 429/194, 197, 218, 224; 29/623.1

[56] References Cited

U.S. PATENT DOCUMENTS

| | | |
|---|---|---|
| 4,215,188 | 7/1980 | Saathoff et al. |
| 4,663,250 | 5/1987 | Ong et al. |
| 4,913,988 | 4/1990 | Langan |
| 4,980,251 | 12/1990 | Thackeray et al. |
| 5,399,447 | 3/1995 | Chaloner-Gill et al. ............ 429/191 |
| 5,427,875 | 6/1995 | Yamamoto et al. |
| 5,474,858 | 12/1995 | Merritt |
| 5,520,850 | 5/1996 | Chaloner-Gill et al. |
| 5,520,903 | 5/1996 | Chang et al. |
| 5,601,623 | 2/1997 | Fauteux et al. ............ 29/623.1 |

OTHER PUBLICATIONS

Prasad et al., "Lithium gel Electrolytes". Proc.Electrochem. Soc., 1991 (month n/a), 1991.

Primary Examiner—M. Nuzzolillo
Attorney, Agent, or Firm—Charles Jew

[57] ABSTRACT

A method of enhancing the thermal stability of electrolytic solvents containing lithium salts by the addition of carbonate additives such as lithium carbonate and calcium carbonate is provided. Electrochemical cells comprising electrolytes with the additives are expected to demonstrate improve performance and cycle life.

28 Claims, No Drawings

ADDITIVES FOR INHIBITING DECOMPOSITION OF LITHIUM SALTS AND ELECTROLYTES CONTAINING SAID ADDITIVES

BACKGROUND OF THE INVENTION

1. Field of the Invention

This invention relates to fabricating non-aqueous electrochemical (electrolytic) cells and, more particularly, to employing carbonate additives in the electrolyte to inhibit the decomposition of LiPF$_6$. The electrochemical cells demonstrate superior performance.

2. State of the Art

Non-aqueous lithium ion electrochemical cells typically include an anode, a lithium electrolyte prepared from a lithium salt dissolved in one or more organic solvents and a cathode of an electrochemically active material, typically an insertion compound. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

Recently, the lithium metal anode has been replaced with a carbon anode such as coke or graphite intercalated with lithium ions to form Li$_x$C. In operation of the cell, lithium ion passes from the carbon through the electrolyte to the cathode where it is taken up just as in a cell with a metallic lithium anode. During recharge, the lithium ion is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur.

One problem encountered in electrolytic cells is the presence of impurities such as acids (e.g., HF) in the electrolytes. HF is derived from certain lithium salts (e.g., LiPF$_6$) that are employed. The acids, which form readily at elevated temperatures, reduce the electrochemical performance of the cells.

SUMMARY OF THE INVENTION

The present invention is directed to electrochemical cells and methods of fabricating them wherein the non-aqueous electrolyte includes a carbonate additive. In one aspect, the invention is directed to an electrolytic cell which comprises: an anode; a cathode; and interposed therebetween a solvent-containing electrolyte which includes: a lithium salt; a solvent; and a carbonate additive that is selected from the group consisting of alkali metal carbonates, alkaline-earth metal carbonates and mixtures thereof.

In another aspect, the invention is directed to a process for preparing an electrolytic cell which includes the steps of:

(a) providing a cathode;
(b) providing an anode;
(c) forming an electrolyte between the cathode and anode wherein the electrolyte includes:
   a lithium salt;
   a solvent; and
   a carbonate additive that is selected from the group consisting of alkali metal carbonates, alkaline-earth metal carbonates and mixtures thereof.

Preferred carbonate additives include lithium carbonate and calcium carbonate. Preferred electrolytes further comprise a polymeric matrix and the preferred salt is LiPF$_6$.

Preferred electrolytic cells have an anode that comprises an intercalation based anode comprising carbon. Preferred cathodes have cathodic material selected from the group consisting of vanadium oxide, lithiated manganese oxide, lithiated nickel oxide, lithiated cobalt oxide, and mixtures thereof.

DETAILED DESCRIPTION OF PREFERRED EMBODIMENTS

The present invention is based in part on the discovery that employing a carbonate additive significantly improves the stability of lithium salts in electrolytic solvents especially at elevated temperatures of from about 40° C., or higher. Electrochemical cells fabricated by the inventive process are expected to demonstrate superior electrochemical performance.

Preferred electrochemical cells include (1) a cathode comprising an active material, (2) an intercalation based carbon anode, with each electrode comprising a polymer binder and capable of reversibly incorporating (e.g., intercalating) an alkali metal ion, and (3) an electrolyte comprising electrolyte solvent, a lithium salt, and a carbonate additive. Each electrode preferably has a current collector. Particularly preferred electrochemical cells and batteries use lithium and salts thereof and the electrolyte further includes a polymeric matrix.

Preferably, the anode comprises an anode film that is laminated onto one or both sides of a current collector which is a thin metal foil or grid. Typically, each anode film is from about 100 μm to about 250 μm in thickness, preferably about 110 μm to about 200 μm, and more preferably about 125 μm to about 175 μm.

Similarly, preferably the cathode comprises a cathode film that is laminated onto one or both sides of the current collector which is a thin foil or grid. Typically, each cathode film is from about 100 μm to about 200 μm in thickness, preferably about 130 μm to about 175 μm, and more preferably about 140 μm to about 165 μm.

The anode and cathode each also preferably includes a current collector that comprises, for example, a screen, grid, expanded metal, woven or non-woven fabric formed from an electron conductive material such as metals or alloys. Preferably, the current collector has a thickness from about 25 μm to about 75 μm, preferably about 35 μm to about 65 μm, and more preferably about 45 μm to about 55 μm. Each current collector is also connected to a current collector tab which extends from the edge of the current collector. In batteries comprising multiple electrochemical cells, the anode tabs are preferably welded together and connected to a copper or nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

Prior to describing this invention in further detail, the following terms will be defined.

The term "carbonate additive" refers to alkali metal and/or alkaline-earth metal carbonates, and preferably lithium carbonate, calcium carbonate and mixtures thereof, that are added to the electrolytes of electrochemical cells. The carbonate additives are essentially non-soluble in the electrolytic solvent. Preferably, the carbonate additive comprises about 0.001% (wt) to about 50% (wt), more preferably about 1% (wt) to about 20 % (wt), and most preferably about 1% (wt) to about 10% (wt) of the electrolyte. For liquid electrolytes, the percentage of carbonate additive will be higher whereas in electrolytes that include a polymeric matrix, the carbonate additive will be proportionately less. Preferably, for electrolytes containing a polymeric matrix, the mount of carbonate additive present will be approximately 1%–10%. The carbonate additives are incorporated in powder form preferably having diameters ranging from about 1 μm to about 20 μm.

It has been demonstrated that the addition of a carbonate additive enhances the thermal stability of electrolytic solvent solutions containing $LiPF_6$. Specifically, a solution containing a 2:1 mixture of ethylene carbonate and dimethyl carbonate and 1M $LiPF_6$ was held at a temperature of about 62° C. UV/visible light spectroscopy analyses of the solution over an 8 day period showed significant changes which are believed to be attributable to decomposition of the salt. In contrast, adding lithium carbonate (0.02% (wt)) to a fresh solution containing the same components significantly reduced the level of decomposition as evidenced by spectroscopy.

The carbonate additive can be mixed in the electrolytic solvent along with the salt. Thus, the carbonate additive is incorporated upon activation of the electrochemical cell precursor. Alternatively, when the electrolyte includes a polymeric matrix, the carbonate additive can be added at a suitable stage during the preparation of the polymeric matrix. For instance, when the solid polymeric matrix is formed by a casting process, the carbonate additive can be added directly to the slurry containing the appropriate copolymer and solvent(s).

The carbonate additives are particularly suited for electrolytic cells where the cathode comprises cathode materials that are adversely affected by the presence of free HF. For instance, HF will initiate manganese dissolution from a $Li_xMn_2O_4$ (spinel) cathode causing lithium ion cell discharge capacity fade. Use of the carbonate additives will limit this mechanism and therefore improve cycle life and high temperature storage of the cells. The carbonate additives will act as an acid (e.g., HF) scavenger to limit the availability of free HF. In all other aspects, the carbonate additive is expected to be a benign component of the electrolyte. Depending on the particular carbonate additive (s) employed, the mount of additive and/or size of the powder used can be optimized accordingly to improve cell performance.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability by liquid solvents including, for example, diethyl ether, dimethyl ether, methanol, cyclohexane, and mixtures thereof or by supercritical fluids. Preferred plasticizers include, for example, dibutyl phthalate, dioctylphthalate, and acetates, glymes and low molecular weight polymers. The plasticizer is preferably first well mixed with a polymer and a solvent. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the electrolyte solution. The precursor typically comprises (each in precursor form) an anode, a cathode, and polymeric matrix. The anode and/or cathode may each include a current collector. The polymeric matrix can function as a separator between the anode and cathode.

The term "activation" refers to the placement of a salt and electrolyte solvent into an electrochemical cell precursor. After activation, the electrochemical cell is charged by an external energy source prior to use.

The term "electrochemical cell" or "electrolytic cell" refers to a composite structure containing an anode, a cathode, and polymeric matrix with a electrolyte solution that is interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499, 4,388,385, 4,414,607, 4,394,280, 4,432,891, 4,539,276, and 4,557,985 each of which is incorporated herein by reference.

The term "a solid matrix forming monomer" refers to inorganic or organic materials which in monomeric form can be polymerized, preferably in the presence of an inorganic ion salt, and a solvent mixture of an organic carbonate and a glyme compound, to form solid matrices which are suitable for use as solid electrolytes in electrolytic cells. Suitable solid matrix forming monomers are well known in the art and the particular monomer employed is not critical. The solid matrix forming monomers may also comprise heteroatoms capable of forming donor acceptor bonds with inorganic cations (e.g., alkali ions).

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253, which patent is incorporated herein by reference in its entirety), and the like as well as mixtures thereof. Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Syrup., 341h, pp. 81–83 (1990) and by Abraham et at., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonate(s) to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product preferably contains repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature.

Alternatively, the solid polymeric matrix can be formed by a casting process which does not require the use of monomers or prepolymers, that is, no curing is required. A preferred method employs a copolymer of vinylidene difluroide and hexafluoropropylene dissolved in acetone or other suitable solvent. Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K. For this invention, the carbonate additive is particularly suitable for use in connection with any salt which forms HF, e.g. $LiAsF_6$, $LiCF_3SO_3$, $LiPF_6$, $(CF_3SO_2)_2NLi$, and mixtures.

The electrolyte typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate.

The term "organic carbonate" refers to hydrocarbyl carbonate compounds of preferably no more than about 12 carbon atoms and which do not contain any hydroxyl groups. Preferred organic carbonates include, for example, aliphatic carbonates and cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3 -oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. The carbon intercalation based anode precursors typically include a polymeric binder and extractable plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), EAA (ethylene acrylic acid copolymer), EVA (ethylene vinyl acetate copolymer), EAA/EVA copolymers, and the like. In one preferred embodiment, the carbon intercalation anode precursor (that is, the anode structure prior extraction) comprises from about 40 to about 70 weight percent of a carbon material (e.g., graphite); from about 8 to about 20 weight percent of a polymeric binder; and from about 15 to about 40 weight percent plasticizer. The anode may also include an electron conducting material such as carbon black.

The cathode typically comprises a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spillel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq2$. Blends can also include $Li_y$-α-$MnO_2$ ($0\leq y<1$) that has a hollandite-type structure as described in U.S. Pat. No. 5,561,007, which is incorporated herein.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. The polymeric binder may comprise EPDM, PVDF, EAA, EVA, or EAA.EVA copolymers, and the like. Suitable binders for use in the cathode have a molecular weight of from about 1,000 to 5,000,000. The polymeric binder of the cathode for the present invention preferably comprises a polymer blend which includes fluoropolymers as further described above.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of a suitable polymeric binder comprising the polymer blend; from about 0 to about 20 weight percent of polyethylene oxide having a number average molecular weight of at least 100,000; and from about 10 to 50 weight percent of solvent comprising a 10:1 to 1:4 (w/w) mixture of an organic carbonate and a glyme. Also included is an ion conducting amount of an inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed. The electrolyte composition further typically comprises from 0 to about 80 weight percent electrolyte solvent (e.g., organic carbonate/glyme mixture) based on the total weight of the electrolyte; preferably from about 60 to about 80 weight percent; and even more preferably about 70 weight percent. The electrolyte composition moreover comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

METHODOLOGY

Electrochemical cells are known in the art. See, for example, U.S. Pat. Nos. 5,300,373, 5,316,556, 5,346,385, 5,262,253, 4,472,487, 4,668,595, and 5,028,500, all of which are incorporated herein. The following illustrates a method of how an electrolytic cell could be fabricated with the inventive process. Examples 1 and 2 describe the process of preparing the anode and cathodes, respectively. Example 3 describes the procedures for fabricating a solid electrolytic cell.

The invention will be described using the anode and cathode structures wherein electrode materials (or films) are laminated onto both sides of the inventive current collectors, however, it is understood that the invention is applicable to other configurations, for example, where only one side of the anode and/or cathode current collector is laminated.

EXAMPLE 1

The anode current collector employed is a sheet of expanded copper metal that is about 50 μm thick. It is available under the designation Delker #2 Cu5-125 (flatten) Delker Corp., Branford, Conn. Both surfaces of the anode current collector can be coated with a layer of an electrically conductive polymeric adhesive material layer. The anode slurry is prepared as follows:

A polymer mixture comprising a copolymer of vinylidene difluoride (VDF) and hexafluoropropylene (HFP) is prepared by mixing 23.3 grams of the copolymer in 100 ml of acetone. The copolymer (ave. melt viscosity 23,000-27,000 poise) is Kynar Flex 2801™ from Elf Atochem North America, Philadelphia, Pa. The mixture is stirred for about 24 hours in a milling jar available from VWR Scientific, San Francisco, Calif., catalogue No. H-04172-00. The copolymer functions as a binder for the carbon in the anode.

A graphite mixture is prepared separately by first adding 80 grams of graphite into 3.1 grams of carbon black into a solution containing 200 grams acetone, 36 grams dibutyl phthalate, and 0.5 grams of a surfactant. A preferred graphite comprises a 50:50 Coy weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M.M.M. Carbon, Willbroeck, Belgium. The graphite mixture is then vigorously mixed in a high shear mixer until a substantially homogeneous blend is formed. A suitable mixer is available from Ross, Model ME100DLX, Hauppauge, N.Y. operating at a high setting (about 10,000 RPM) for 30 minutes.

The anode slurry is prepared by mixing the polymer mixture and the graphite mixture together under low shear conditions to form the anode slurry wherein the components are well mixed. A portion of the acetone is allowed to evaporate from the slurry before it was laminated onto each side of the current collector. Anode films form when the remaining portion of the acetone evaporates.

EXAMPLE 2

The cathode current collector employed is a sheet of expanded aluminum that is about 50 μm thick. The aluminum grid is available under the designation 2AL5-077 from Delker Corp. Both surfaces of the cathode current collector can be coated with the layer of electrically conductive polymeric adhesive material. The cathode slurry is prepared as follows:

A polymer mixture comprising a copolymer of vinylidene difluoride (VDF) and hexafluoropropylene (HFP) is prepared by mixing 26.7 grams of the copolymer in 100 grams of acetone. The copolymer is Kynar Flex 2801™. The mixture is stirred for about 24 hours in a milling jar.

A cathode active material mixture is prepared separately by first adding 173.4 grams of a cathode-active material of $Li_xMn_2O_4$ (spinel) ($0<x\leq2$), 14.7 grams of carbon black (Super P™) into a solution containing 333.3 grams acetone, 51.9 grams dibutyl phthalate, and 0.9 grams of a surfactant. The mixture is then vigorously mixed in the a high shear mixer until a substantially homogeneous blend is formed.

A cathode slurry is prepared by mixing the polymer mixture and the cathode active material mixture together under low shear conditions to form the cathode slurry wherein the components are well mixed. A portion of the acetone is allowed to evaporate from the slurry before it is laminated onto each side of the current collector. Cathode films form when the remaining portion of the acetone evaporates.

The above anode and cathode films were formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the current collector.

EXAMPLE 3

A solid electrochemical cell is prepared by first positioning a polymeric matrix between the anode and cathode and thereafter fusing the structures under moderate pressure and temperature (e.g., 130° C.) to form an electrochemical cell precursor. The polymeric matrix is formed by casting a polymeric slurry comprising the carbonate additive, acetone, dibutyl phthalate, silanized fumed $SiO_2$, and the VDF/HFP copolymer on a suitable substrate or carrier web and allowing the acetone to evaporate. The carbonate additive becomes incorporated into the polymer matrix. No curing by radiation is required. The $SiO_2$ is a flier which impart toughness and strength to the film. In addition, it is believed that the $SiO_2$ assists the activation process by creating physico-chemical conditions such that the electrolyte solution quickly and completely fills the pores created by the extraction of the dibutyl phthalate. Preferably, the polymeric slurry is mixed under low shear conditions as not to degrade the copolymer. The precursor is then packaged in moisture-impermeable material which is described, for example, in U.S. Pat. No. 5,326,653 which is incorporated herein.

In the process of preparing the polymer mixtures for both the anode and cathode slurries, it is preferred that the polymer (or copolymer) not be subject to high shear so as to be degraded. It is believed that polymer degradation contributes to the creation of the polymer concentration gradient in the electrode film. Furthermore, preferably the polymer or copolymer employed has a high average molecular weight. Preferably the average molecular weight is between 50K to 750K, more preferably 200K to 500K, and most preferably 250K to 300K. Furthermore, it is preferred that polymer or copolymer has a narrow molecular weight range. Preferably $$\frac{M_n}{M_w} \cong 1.0.$$

Next, the dibutyl phthalate plasticizer is extracted from the precursor before being activated. Extraction can be accomplished using conventional organic liquid solvents such as diethyl ether or by a dense fluid or gas which refers to a gas compressed and heated to either supercritical or subcritical conditions to achieve liquid-like densities. Dense gases and fluids are known in the art. See, for example, U.S. Pat. Nos. 5,013,366, 5,267,455, 4,219,333, 4,012,194, and 3,969,196, which are incorporated herein. A preferred dense gas is carbon dioxide. Following extraction, the precursor is first pre-packaged in moisture impermeable material described, for example, in U.S. Pat. No. 5,326,653 which is incorporated herein and then activated. Activation preferably takes place in an inert (e.g., argon) atmosphere. Finally, the packaging is sealed and the electrochemical cell is ready for use.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. An electrolytic cell which comprises:

an anode;

a cathode;

and interposed therebetween a solvent-containing electrolyte which comprises:

a lithium salt;

a solvent; and a carbonate additive comprising calcium carbonate.

2. The electrolytic cell of claim 1, wherein said carbonate additive further comprises lithium carbonate.

3. The electrolytic cell of claim 1, wherein said carbonate additive is a powder having a diameter that ranges from about 1 µm to about 20 µm.

4. The electrolytic cell of claim 1 wherein the carbonate additive comprises from about 1% to about 20% by weight of the electrolyte.

5. The electrolytic cell of claim 2, wherein the lithium carbonate comprises from about 1% to about 20% by weight of the electrolyte.

6. The electrolytic cell of claim 3, wherein the calcium carbonate comprises from about 1% to about 20% by weight of the electrolyte.

7. The electrolytic cell of claim 4, wherein the electrolyte further comprises a polymeric matrix.

8. The electrolytic cell of claim 5, wherein the electrolyte further comprises a polymeric matrix.

9. The electrolytic cell of claim 6, wherein the electrolyte further comprises a polymeric matrix.

10. The electrolytic cell of claim 1 wherein the anode comprises an intercalation based anode comprising carbon.

11. The electrolytic cell of claim 1 wherein the cathode comprises material selected from the group consisting of vanadium oxide, lithiated manganese oxide, lithiated nickel oxide, lithiated cobalt oxide, and mixtures thereof.

12. The electrolytic cell of claim 11, wherein the anode comprises an intercalation based anode comprising carbon.

13. The electrolytic cell of claim 12 wherein the salt is $LiPF_6$.

14. The electrolytic cell of claim 1 wherein the solvent is selected from the group consisting of ethylene carbonate, dimethyl carbonate, propyl carbonate, diethyl carbonate, methylethyl carbonate and mixtures thereof.

15. A process for preparing an electrolytic cell which comprises: (a) providing a cathode;

(b) providing an anode;

(c) forming an electrolyte between the cathode and anode wherein the electrolyte comprises:

a lithium salt, a solvent; and a carbonate additive comprising calcium carbonate.

16. The process of claim 15, wherein said carbonate additive further comprises lithium carbonate.

17. The process of claim 15, wherein said carbonate additive is a powder having a diameter that ranges from about 1 µm to about 20 µm.

18. The process of claim 15, wherein the carbonate additive comprises from about 1% to about 20% by weight of the electrolyte.

19. The process of claim 16, wherein the lithium carbonate comprises from about 1% to about 20% by weight of the electrolyte.

20. The process of claim 17, wherein the calcium carbonate comprises from about 1% to about 20% by weight of the electrolyte.

21. The process of claim 18, wherein the electrolyte further comprises a polymeric matrix.

22. The process of claim 19, wherein the electrolyte further comprises a polymeric matrix.

23. The process of claim 20, wherein the electrolyte further comprises a polymeric matrix.

24. The process of claim 15, wherein the anode comprises an intercalation based anode comprising carbon.

25. The process of claim 15, wherein the cathode comprises material selected from the group consisting of vanadium oxide, lithiated manganese oxide, lithiated nickel oxide, lithiated cobalt oxide, and mixtures thereof.

26. The process of claim 25, wherein the anode comprises an intercalation based anode comprising carbon.

27. The process of claim 26, wherein the salt is $LiPF_6$.

28. The process of claim 15, wherein the solvent is selected from the group consisting of ethylene carbonate, dimethyl carbonate, propyl carbonate, diethyl carbonate, methylethyl carbonate, and mixtures thereof.

* * * * *